(12) United States Patent
Bock (10) Patent No.: US 9,344,649 B2
(45) Date of Patent: May 17, 2016

(54) FLOATING POINT IMAGE SENSORS WITH DIFFERENT INTEGRATION TIMES

(71) Applicant: Semiconductor Components Industries, LLC, Phoenix, AZ (US)

(72) Inventor: Nikolai Bock, San Jose, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 14/458,108

(22) Filed: Aug. 12, 2014

(65) Prior Publication Data

US 2015/0055000 A1 Feb. 26, 2015

Related U.S. Application Data

(60) Provisional application No. 61/869,381, filed on Aug. 23, 2013.

(51) Int. Cl.
*H04N 5/355* (2011.01)
*H04N 5/3745* (2011.01)

(52) U.S. Cl.
CPC ....... *H04N 5/35554* (2013.01); *H04N 5/37452* (2013.01)

(58) Field of Classification Search
CPC ............ H04N 5/355–5/35581; H04N 5/37452
See application file for complete search history.

(56) References Cited

U.S. PATENT DOCUMENTS

| | | | |
|---|---|---|---|
| 2008/0012975 A1* | 1/2008 | Sato | H04N 5/335 348/296 |
| 2008/0049133 A1 | 2/2008 | Bock | |
| 2008/0198251 A1* | 8/2008 | Xu | H04N 5/3532 348/297 |
| 2011/0013064 A1* | 1/2011 | Lahav | H04N 5/335 348/296 |
| 2011/0019019 A1* | 1/2011 | Liu | H04N 5/35554 348/222.1 |
| 2012/0157852 A1* | 6/2012 | Wegener | G01S 7/52034 600/454 |
| 2013/0070139 A1* | 3/2013 | Kirsch | H04N 5/341 348/302 |

OTHER PUBLICATIONS

Decker et.al., "A 256×256 CMOS Imaging Array with Wide Dynamic Range Pixels and Column-Parallel Digital Output," IEEE Journal of Solid-State Circuits, vol. 33, Dec. 1998, pp. 2081-2091.
Smith et.al., "BLINC: A 640×480 CMOS Active Pixel Video Camera with Adaptive Digital Processing, Extended Optical Dynamic Range, and Miniature Form Factor", Proceedings of SPIE, vol. 4306, May 15, 2001, pp. 41-49.

(Continued)

*Primary Examiner* — Christopher K Peterson
(74) *Attorney, Agent, or Firm* — Treyz Law Group, P.C.; Vineet Dixit (57) ABSTRACT

An image sensor may include an array of image sensor pixels arranged in rows and columns. Each image pixel arranged along a given column may be coupled to analog-to-digital converter (ADC) circuitry that is capable of converting analog pixel signals into a floating point number. The ADC circuitry may be configured to obtain an illumination value during an auto exposure period. The illumination value, which serves as an exponent value, can be stored as tile data in respective shutter tile column memory circuits. A rolling shutter scheme may be implemented to read signals out from the array. Each tile may be allowed to integrate for a different period of time depending on the exponent value stored in the shutter tile column memory circuits. During readout, the signal generated from the ADC circuitry may represent a mantissa value that is combined with the exponent value to yield a floating point number.

20 Claims, 8 Drawing Sheets

(56) References Cited

OTHER PUBLICATIONS

Bock et al., "A Wide-VGA CMOS Image Sensor with Global Shutter and Extended Dynamic Range," Proc. of IEEE Workshop on CCDs and AIS, Karuizawa, pp. 222-225, Dec. 2005.

Stoppa et al., "Novel CMOS Image Sensor with a 132-dB Dynamic Range," IEEE Journal of Solid-State Circuits 37(12), pp. 1846-1852, 2002.

Rhee et al., "Wide Dynamic Range CMOS Image Sensor with Pixel Level ADC," Electronic Letters 39(4), pp. 360-361, Feb. 2003.

Yadid-Pechty et al., "Wide Intrascene Dynamic Range CMOS APS Using Dual Sampling," IEEE Trans. on Electron Devices, vol. 44, Oct. 1977.

Yang et al., "Comparative Analysis of SNR for Image Sensors with Enhanced Dynamic Range," Proc. SPIE, vol. 3649, pp. 197-211, Jan. 1999.

Mase et al., "A Wide Dynamic Range CMOS Image Sensor with Multiple Exposure-Time Signal Outputs and 12-bit Column-Parallel Cyclic A/D Converters," IEEE Trans. on Electron Devices, vol. 40, Dec. 2005.

Gonzalez et al., "Digital Image Processing", Prentice-Hall, New Jersey 2002.

Bock, U.S. Appl. No. 61/869,579, filed Aug. 23, 2013.

* cited by examiner

FLOATING POINT IMAGE SENSORS WITH DIFFERENT INTEGRATION TIMES

This application claims the benefit of provisional patent application No. 61/869,381, filed Aug. 23, 2013, which is hereby incorporated by reference herein in its entirety.

BACKGROUND

This relates generally to imaging devices, and more particularly, to CMOS image sensors.

Modern electronic devices such cellular telephones, cameras, and computers often use digital image sensors. Imagers (i.e., image sensors) may be formed from a two-dimensional array of image sensing pixels. Each pixel may include a photosensor such as a photodiode that receives incident photons (light) and converts the photons into electrical signals. Image sensors are sometimes designed to provide images to electronic devices using a Joint Photographic Experts Group (JPEG) format or any other suitable image format.

In certain applications, it may be desirable to capture high-dynamic range images. While highlight and shadow detail may be lost using a conventional image sensor, highlight and shadow detail may be retained using image sensors with high-dynamic-range (HDR) imaging capabilities.

Two major conventional approaches for achieving higher dynamic range in image sensors include: (1) an in-pixel HDR implementation based on companding, multiple storages, and signal controlled reset and (2) dual image captures with different integration times. Drawbacks to the companding pixel approach include nonlinear output that hampers subsequent color processing, increased pixel fixed-pattern noise (FPN), signal-to-noise (SNR) dip at knee point, and low contrast in the highlights. The multiple storage and signal controlled reset approaches are undesirable because they require extra pixel area along with additional column circuitry. On the other hand, dual image capture can also suffer from SNR dip at knee point and may require high speed non-destructive readout along with on-chip memory and additional column circuitry.

It would therefore be desirable to be able to provide improved imaging devices for capturing high-dynamic-range images.

DETAILED DESCRIPTION

Imaging systems having digital camera modules are widely used in electronic devices such as digital cameras, computers, cellular telephones, medical devices, and other electronic devices. A digital camera module may include one or more image sensors that gather incoming light to capture an image.

Figure 1:
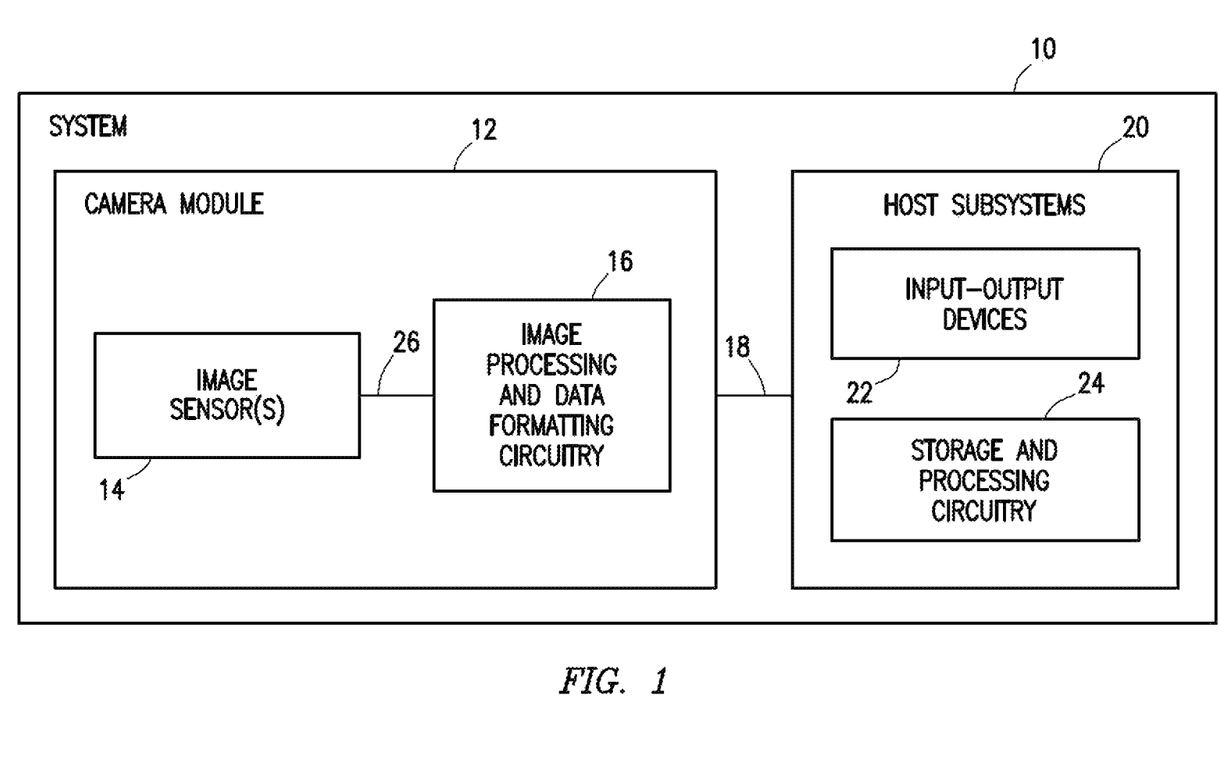
FIG. 1 is a schematic diagram of an illustrative imaging system with a camera sensor in accordance with an embodiment of the present invention.

FIG. 1 is a diagram of an illustrative imaging system that uses an image sensor to capture images. System 10 of FIG. 1 may be a vehicle safety system (e.g., an active braking system or other vehicle safety system), may be a surveillance system, or may be an electronic device such as a camera, a cellular telephone, a video camera, or other electronic device that captures digital image data. System 10 may include camera module 12 having one or more image sensors 14. Image sensor 14 may have one or more associated lenses for focusing light onto image sensor 14. Image sensor 14 may include photosensitive elements (e.g., image sensor pixels) that convert the light into digital data.

In general, image sensor 14 may have any number of pixels (e.g., hundreds, thousands, millions, or more pixels). A typical image sensor may, for example, have millions of pixels (e.g., megapixels). As examples, image sensor 14 may include bias circuitry (e.g. source follower load circuits), sample and hold circuitry, correlated double sampling (CDS) circuitry, amplifier circuitry, analog-to-digital (ADC) converter circuitry, data output circuitry, memory (e.g. buffer circuitry), address circuitry, and other suitable control circuitry for interfacing with the image sensor pixels.

Still and video image data from camera sensor 14 may be provided to image processing and data formatting circuitry 16 via path 26. Image processing and data formatting circuitry 16 may be used to perform image processing functions such as three-dimensional depth sensing, data formatting, adjusting white balance and exposure, implementing video image stabilization, face detection, etc. Image processing and data formatting circuitry 16 may also be used to compress raw camera image files, if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common integrated circuit. The use of a single integrated circuit to implement camera sensor 14 and image processing and data formatting circuitry 16 can help to reduce costs.

Camera module 12 may convey acquired image data to host subsystems 20 over path 18 (e.g., image processing and data formatting circuitry 16 may convey image data to subsystems 20). System 10 may provide a user with numerous high-level functions. In a computer or advanced cellular telephone, for example, a user may be provided with the ability to run user applications. To implement these functions, host subsystem 20 of system 10 may include storage and processing circuitry 24 and input-output devices 22 such as keypads, input-output ports, joysticks, and displays. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, or other processing circuits.

Figure 2:
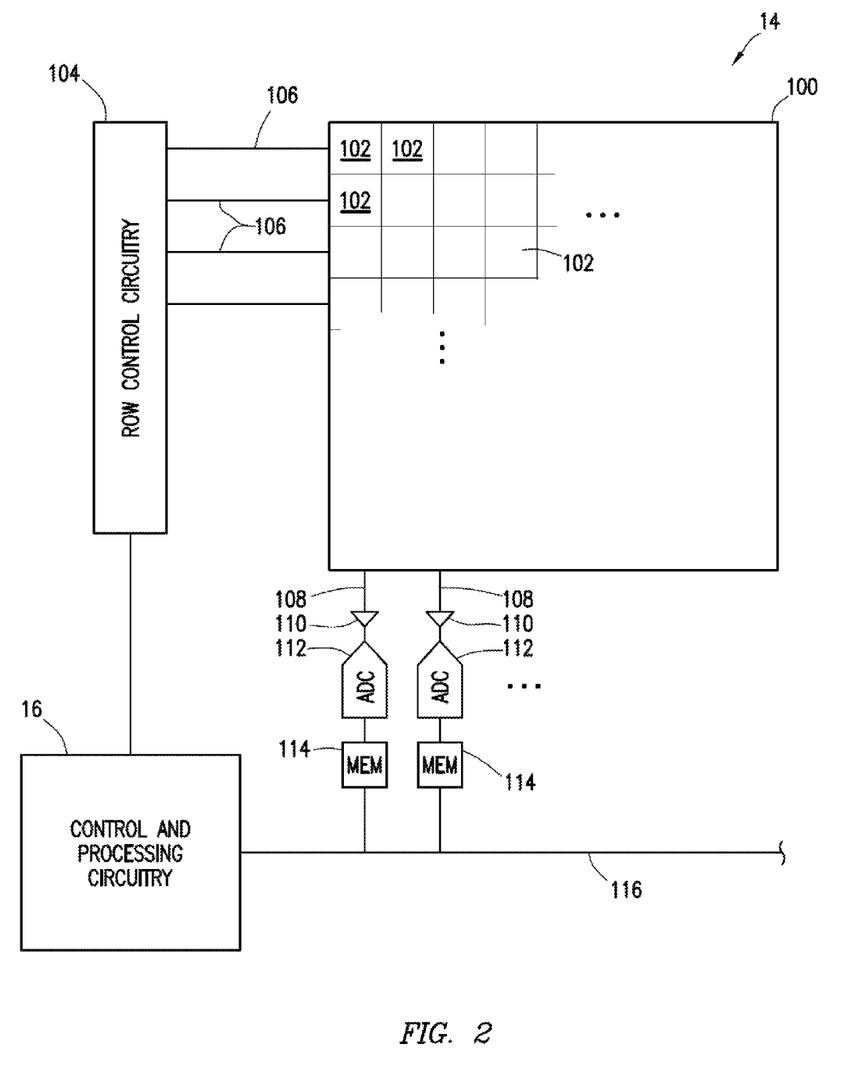
FIG. 2 is a diagram of an illustrative image sensor with an array of image sensor pixels in accordance with an embodiment of the present invention.

An illustrative arrangement for camera module 12 is shown in FIG. 2. As shown in FIG. 2, camera module 12 may include image sensor 14 and control and processing circuitry 16. Image sensor 14 may include a pixel array such as array 100 of image sensor pixels 102. Control circuitry 16 may be coupled to row control circuitry 104 and global data path 116. Row control circuitry 104 may receive row addresses from control circuitry 16 and may supply corresponding row control signals to image pixels 102 over control paths 106. For example, row control circuitry 104 may generate reset signals on reset lines in paths 106, charge transfer control signals on charge transfer control lines in paths 106, and row select (e.g., row readout) signals on row select lines in paths 106 to control the operation of pixels in array 100. If desired, row control circuitry 104 and array 100 may be integrated together in a single integrated circuit (as an example).

One or more conductive lines such as column lines 108 may be coupled to each column of image pixels 102 in image pixel array 100. Column lines 108 may be used for reading out image signals from image pixels 102 and for supplying bias signals (e.g., bias currents or bias voltages) to image pixels 102. During image pixel readout operations, a pixel row in image pixel array 100 may be selected using row control circuitry 104 and image data associated with image pixels 102 of that pixel row may be read out on column lines 108.

Each column line 108 may be coupled to column circuitry such as column amplifier 110, analog-to-digital converter (ADC) circuit 112, and column memory circuit 114. ADC circuit 112 may be used to convert analog signals on column lines 108 into corresponding digital signals before outputting to a corresponding memory circuit 114.

Array 100 may have any number of rows and columns. In general, the size of array 100 and the number of rows and columns in the array will depend on the particular implementation of image sensor 14. While rows and columns are generally described herein as being "horizontal" and "vertical," respectively, rows and columns may refer to any grid-like structure (e.g., features described herein as rows may be arranged vertically and features described herein as columns may be arranged horizontally).

The arrangement of FIG. 2 in which each pixel column line 108 is coupled to a corresponding ADC is sometimes referred to as a parallel column architecture. Conventionally, the ADC in each column is configured to exhibit high resolution. As an example, the ADC in each column may exhibit 12-bit resolution. High dynamic range (HDR) image sensors may require even more ADC resolution. Such types of high resolution ADCs can, however, consume a significant amount of power, occupy a large percentage of die area, and require long conversion times.

One way of addressing these drawbacks is to reduce the ADC resolution without having to compromise on dynamic range. In order to accomplish this, it may be helpful to understand the components of an image. In general, an image is formed by two factors: (1) the two-dimensional illumination of the scene multiplied by (2) the two-dimensional pattern of reflectance in a scene. Typically, most of the information in the mage is contained in the reflectance, which has about 30 dB dynamic range (e.g., which requires only a 5-bit depth). For comparison, the human eye can discriminate about 60 gray levels, which is equivalent to a 6-bit depth. Typical display components have 256 gray levels, which is equivalent to an 8-bit depth.

As described above, a two-dimensional image may be a function of (1) the amount of source illumination incident on a scene and (2) the amount of illumination reflected by objects in the scene, as shown in the following expression:

$$f(x,y)=i(x,y)*r(x,y) \qquad (1)$$

where illumination i(x,y) has a value between zero and positive infinity, and where reflectance r(x,y) has a value between zero and one. In practice, the illumination has a brightness range of about 170 dB, whereas the reflectance has a brightness range of only about 30 dB. Combining these two components, an image can have up to 200 dB of dynamic range. To cover 200 dB of dynamic, at least a 32-bit depth is required.

However, taking in account that most of the image information is contained in the reflectance r(x,y), a floating point representation of the image signal is proposed:

$$f=r*2^i \qquad (2)$$

where mantissa r represents reflectance and exponent i represents signal range determined by scene illumination. Assuming that reflectance r has a 6-bit depth, the floating point representation only requires a total of 11 bits instead of 32 bits to resolve 200 dB of brightness range. In this example, the exponent i has a 5-bit depth.

Using this floating point representation, the first term r may be proportional to the image signal $V_S$ when exponent i is equal to zero, whereas the second term $2^i$ may be proportional to the ratio of integration time $T_{int}$ to an ADC reference voltage level Vref. To support the base-2 exponent term, integration time $T_{int}$ and ADC reference voltage level Vref should be incremented in multiples of 2 (e.g. the total light range has to be expressed in powers of 2). The digitized photo signal $V_S$ can therefore be expressed as follows:

$$V_S = \frac{I_{ph}}{q} C_G K_{SF} 2^N \frac{T_{int}}{V_{ref}} \qquad (3)$$

where $I_{ph}$ is the photocurrent, q is the electron charge constant. $C_G$ is equal to the pixel conversion gain, $K_{SF}$ is the pixel source follower gain, N is the ADC bit depth, $T_{int}$ is the integration time and Vref is the ADC reference voltage level. Since $T_{int}$ and Vref should be in power of 2 increments, they can be expressed as follows:

$$T_{int}=2^n T_{int0} \qquad (4)$$

$$V_{ref}=2^m V_{ref0} \qquad (5)$$

where $T_{int0}$ represents the minimum integration time, and where $V_{ref0}$ represents the minimum ADC reference voltage level. Substituting expressions 4 and 5 back into equation 3, equation 3 can then be rewritten as follows:

$$V_S = \left[ C_G K_{SF} 2^N \frac{T_{int0}}{qV_{ref0}} \right] I_{ph} 2^{n-m} \qquad (6)$$

where n depends on the integration time and where m depends on the ADC reference voltage. The minimum integration time $T_{int0}$ may be equal to one row time for a rolling shutter image sensor. For a 23 megabit image sensor, n can reach 12 for full frame integration time. Assuming m ranges from 0 to 3, the image sensor can achieve a dynamic range of 130 dB. This type of floating point representation might be especially useful for high dynamic range (HDR) imaging.

Figure 3:
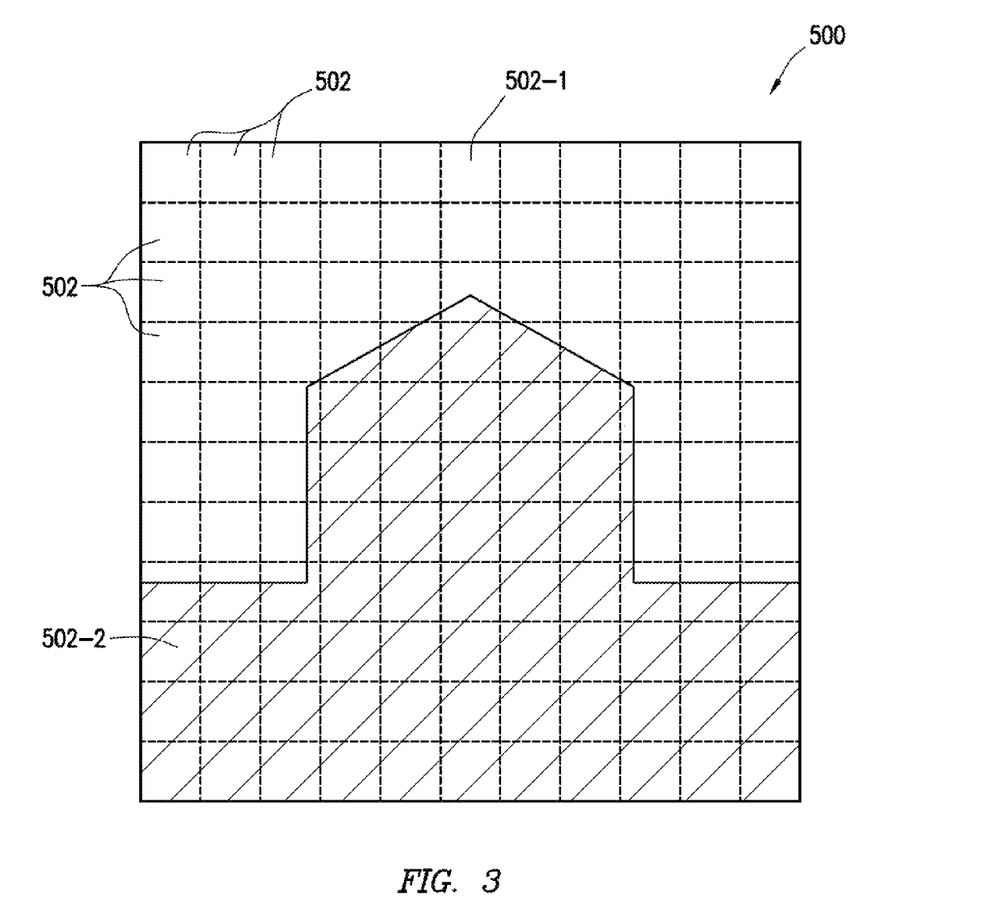
FIG. 3 is a diagram show how an image pixel array may be organized into "tiles" in accordance with an embodiment of the present invention.

To further improve intra-scene dynamic range, it may also be desirable to divide an image into separate tiles as shown in FIG. 3. This approach is feasible since illumination generally exhibits low spatial frequency.

As shown in FIG. 3, an image pixel array 500 that is used to acquire an image may be divided into an array of tiles 502. Each tile 502 in the array may include an X number of pixels in the horizontal direction and a Y number of pixels in the vertical direction. To provide enhanced intra-scene dynamic range, each tile should have its own integration time and its own Vref level, which can be determined during an initialization process (e.g. during an auto exposure process or during some other exponent conversion operation) and optionally updated periodically/aperiodically. In the example of FIG. 3, a tile 502-1 corresponding to a brighter part of the image may be assigned a shorter integration time and/or a high Vref level, whereas a tile 502-2 corresponding to a darker part of the image may be assigned a relatively longer integration time and/or lower Vref level. If desired, the number and size of tiles 502 can be fixed or adapted to each scene by image processor 16 (FIGS. 1 and 2).

Figure 4:
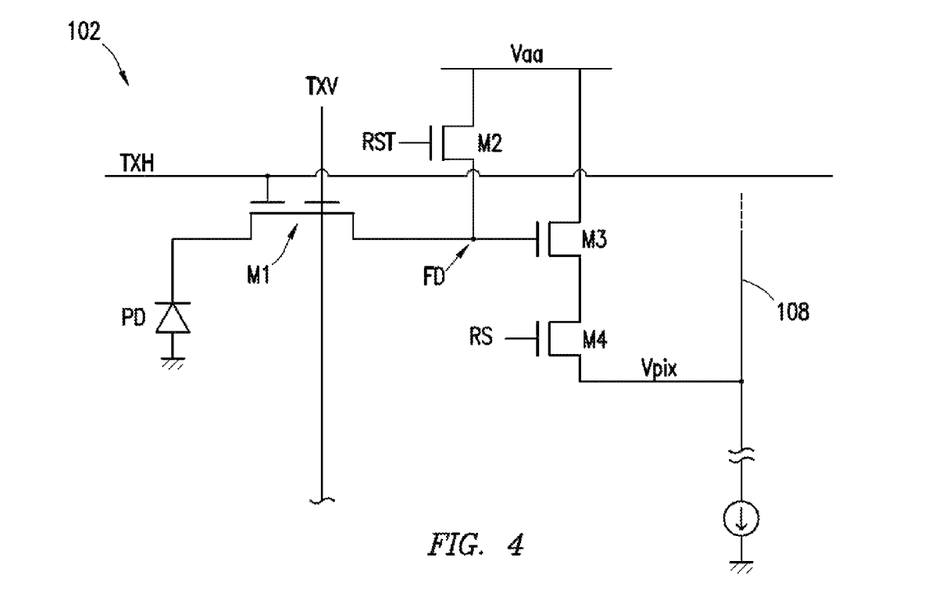
FIG. 4 is a circuit diagram of an illustrative 4T image sensor pixel with a double gate charge transfer transistor in accordance with an embodiment of the present invention.

To support different integration times in a roller shutter scheme, a pixel such as pixel 102 having a double gate charge transfer transistor is provided (see, e.g., FIG. 4). As shown in FIG. 4, pixel 102 may include a photosensitive element such as photodiode PD, a double gate charge transfer transistor M1, a reset transistor M2, a source follower (SF) transistor M3, and a row select transistor M4. Photodiode PD may be coupled to a floating diffusion (FD) region via charge transfer transistor M1. Charge transfer transistor M1 may have a first gate terminal that is coupled to a horizontal gate control path on which horizontal transfer signal TXH is provided and a second gate terminal that is coupled to a vertical gate control path on which vertical transfer signal TXV is provided. The use of horizontal and vertical gate control signals TXH and TXV allows for two-dimensional control of the pixel reset while saving die area.

The floating diffusion region FD may be coupled to pixel supply voltage Vaa by reset transistor M2 that is controlled by reset signal RST. Floating diffusion region FD may be coupled to pixel column path 108 via source follower transistor M3 and row select transistor M4. Transistor M4 may be selectively activated by asserting row select signal RS. Pixel output column path 108 may serve as a pixel output node shared by the pixels of a column of the image pixel array.

Figure 5:
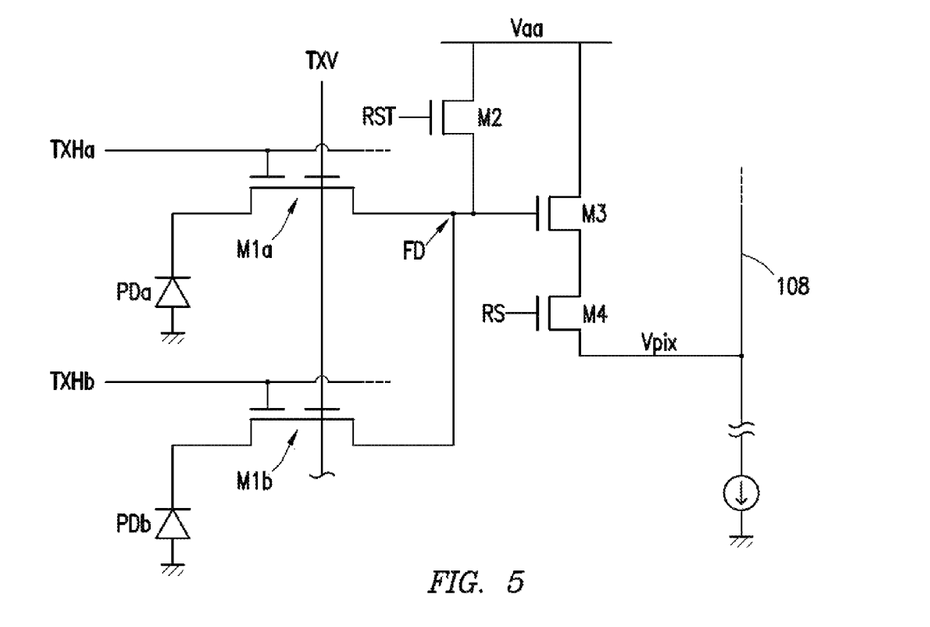
FIG. 5 is a circuit diagram of a two-way shared pixel having double gate charge transfer transistors in accordance with an embodiment of the present invention.

To further conserve die area, a 2-way shared pixel implementation may be used (see, e.g., FIG. 5). As shown in FIG. 5, a first photodiode PDa is coupled to a shared floating diffusion region FD via a first double gate charge transfer transistor M1a, whereas a second photodiode PDb is coupled to the shared FD region via a second double gate charge transfer transistor M1b. Configured in this way, transistors Mia and M1b have first gate terminals that are controlled by different horizontal gate control signals TXHa and TXHb, respectively, and second gate terminals that are controlled by a common vertical gate control signal TXV (e.g., horizontal transfer signals may be separate, whereas vertical transfer signals may be shared).

Figure 6:
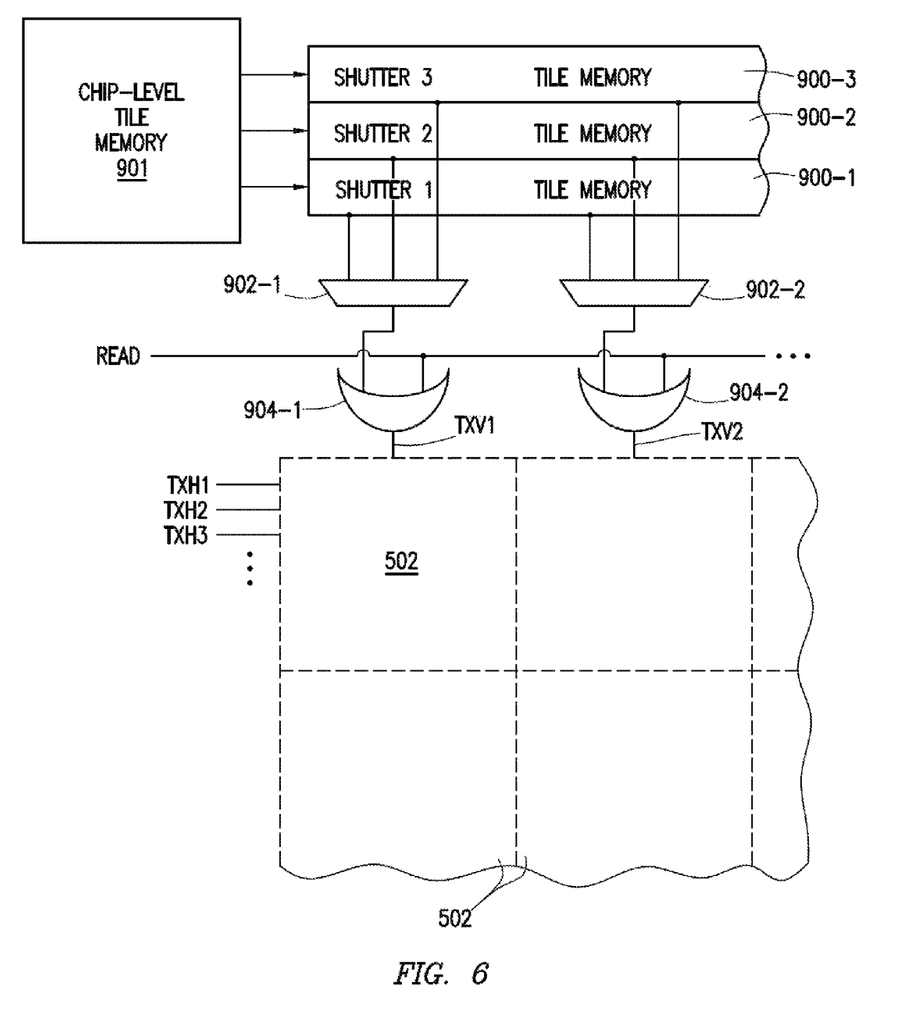
FIG. 6 is a diagram of illustrative column shutter tile memory circuits for implementing different shutter times in accordance with an embodiment of the present invention.

As described above, four different integration times (e.g., m ranging from 0 to 3) may be needed to cover 130 dB of dynamic range without experience significant SNR dip at the boundaries of different exposures. To support four different integration times, three column memory circuits may be used for storing tile shutter information. FIG. 6 is a diagram showing an exemplary pixel array configuration having a first shutter tile column memory circuit 900-1, a second shutter tile column memory circuit 900-2, and a third shutter tile column memory circuit 900-3.

As shown in FIG. 6, each tile 502 may receive multiple row control signals (e.g. horizontal charge transfer signals TXH1, TXH2, TXH3, etc.) and a vertical gate control signal TXV from one of tile memory circuits 900 (e.g., circuits 900-1, 900-2, and 900-3). For example, a first column of tiles 502 may receive a first vertical column gate control signal TXV1 via a first multiplexer 902-1 and a first logic OR gate 904-1, whereas a second column of tiles 502 may receive a second vertical column gate control signal TXV2 via a second multiplexer 902-2 and second logic OR gate 904-2. Other tile columns may be coupled to the tile memory circuits 900 in a similar fashion.

Each of the column multiplexers 902 (e.g., multiplexers 902-1, 902-2, etc.) may have a first input that is coupled to memory 900-1, a second input that is coupled to memory 900-2, a third input that is coupled to memory 900-3, and an output to which bits from a selected one of its three inputs are routed. Each of logic OR gates 904 (e.g., gates 904-1, 904-2, and so on) may have a first input that receives a global read control signal READ, a second input that is coupled to the output of an associated multiplexer 902, and an output on which a corresponding vertical gate control signal may be provided. Multiplexers 902 and logic OR gates 904 configured as such may therefore serve as decoding circuits that connect the shutter tile column memory circuits to appropriate tiles during readout operations.

Connected in this way, the vertical gate control signals may be globally asserted whenever control signal READ is high. Whenever control signal READ is deasserted, the vertical gate control signals may be controlled based on values stored in the shutter tile column memory circuits 900. The content of the shutter tile column memory circuits 900 may be updated in advance using column memory buffers (not shown) and may be obtained during sensor initialization processes such as auto exposure and gain compensation operations (as examples). The storage capacity of shutter tile column memory circuits 900 may depend on the number of tiles and the total number of shutters.

During initialization operations (e.g., in parallel with auto exposure operations), one frame data is read out while minimum integration time $T_{int0}$ is set. Frame data that is read out during initialization may be analyzed in digital processing circuitry 16 (see, FIG. 1). Digital block 16 may then calculate all shutter tile parameters and store the tile parameters in a global chip-level tile memory such as chip-level tile memory circuit 901. During actual readout, chip-level tile memory circuit 901 (see, FIG. 6) may preload some of the tile parameters into each of the shutter tile column memory circuits 900.

Figure 7:
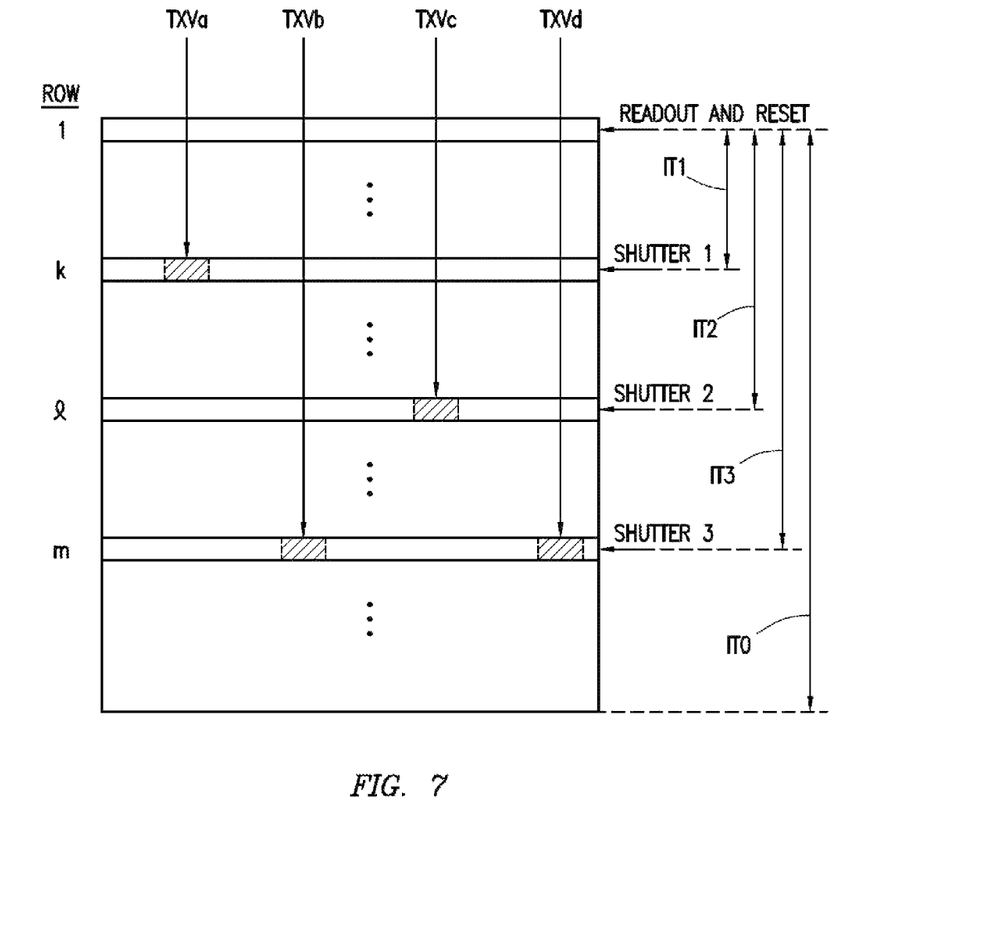
FIG. 7 is a diagram illustrating a rolling shutter scheme with different integration times in accordance with an embodiment of the present invention.

FIG. 7 is a diagram illustrating a rolling shutter scheme with three additional shutter resets (yielding a total of four different integration times) in accordance with an embodiment of the present invention. The example of FIG. 7 assumes that row 1 is currently being read out. Immediately, following the readout of row 1, the pixels in row 1 may be reset (e.g., all photodiodes PD in row 1 may be reset by asserting the associated reset signal RST and horizontal/vertical gate control signals). While row 1 is being reset, a selected tile in row k (e.g., a tile in row k that receives vertical gate control signal TXVa) may be reset by a first additional shutter (Shutter1); a selected tile in row L (e.g., a tile in row L that receives vertical gate control signal TXVc) may be reset using a second additional shutter (Shutter2); and selected tiles in row m (e.g. a first tile in row m that receives TXVb and a second tile in row m that receives TXVd) may be reset using a third additional shutter (Shutter3). The different pixels that are reset using the different shutters may generally be part of different tiles in the array. This is merely illustrative. Other tiles may be selectively reset using Shutter1, Shutter2, and Shutter3.

As shown in FIG. 7, tiles that are reset using Shutter1 may be read out a first integration time after the readout of row 1 (indicated as IT1); tiles that are reset using Shutter2 may be read out a second integration time after the readout of row 1 (indicated as IT2); and tiles that are reset using Shutter3 may be read out a third integration time after the readout of row 1 (indicated as IT3). Since the different shutters corresponding to different rows in the array, integration times IT1, IT2, and IT3 are generally different. As an example, IT2 may be equal to two times IT1, and IT3 may be equal to four times IT1. As another example, IT2 may be equal to two times IT1, and IT3 may be equal to eight times IT1. The integration time of the entire frame is indicated as IT0, wherein IT0 is greater than each of IT1, IT2, and IT3.

Figure 8:
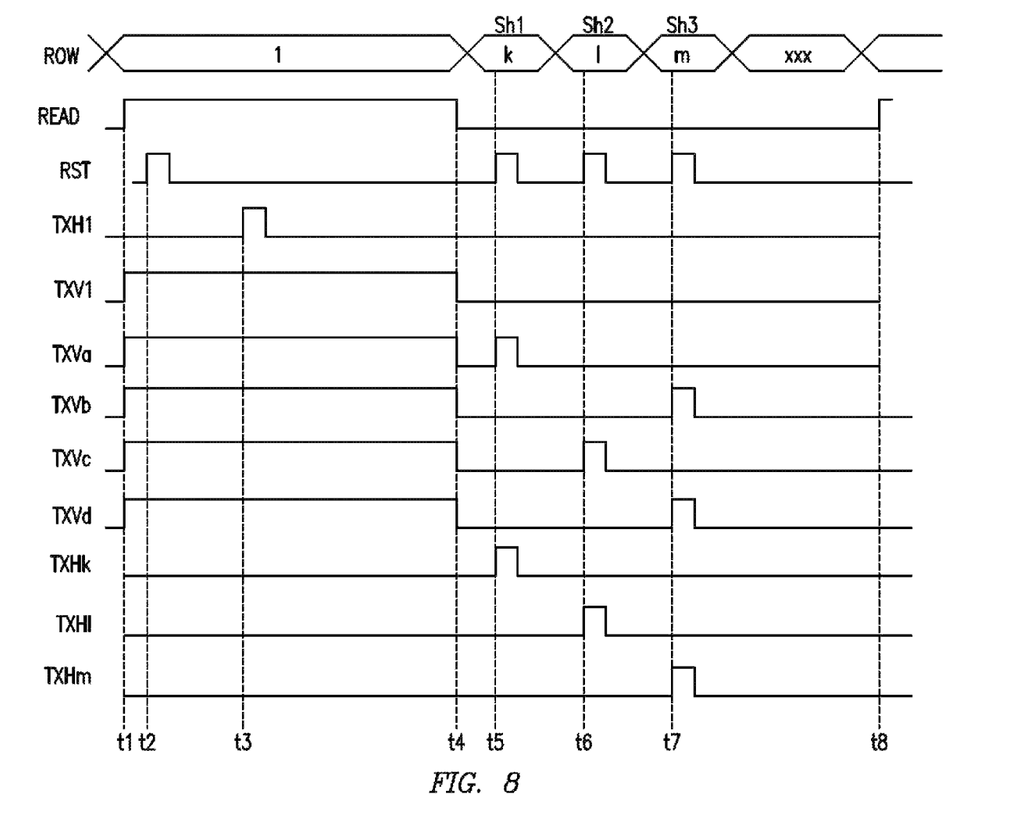
FIG. 8 is a timing diagram that illustrates the operation for an image pixel array having pixels with double gate charge transfer transistors of the type shown in FIGS. 3 and 4 for one row time in accordance with an embodiment of the present invention.

FIG. 8 is a timing diagram that illustrates the operation of the image pixel array in FIG. 7 for one row time. At time t1, signal READ may be asserted to begin reading out from row 1. While READ is asserted, all of the vertical gate control signals (e.g. TXVa, TXVb, TXVc, TXVd, and other vertical transfer gate controls signals corresponding to other tiles) may be forced high using the respective logic OR gates 904 of FIG. 6. During readout of row 1, signal RST may be pulsed high (at time t2), and signal TXH1 may be pulsed high (at time t3) to perform a correlated double sampling (CDS) operation.

At time t4, signal READ may be deasserted. Thereafter, the different shutter resets may be performed. At time t5 (i.e., a Shutter1 activation time), signal RST, TXVa, and TXHk may be simultaneously pulsed high to reset pixels that are arranged along row k and that receive TXVa. This example in which only row k is reset using Shutter1 is merely illustrative. Any number of rows and tile columns may be reset using Shutter1. All pixels that are being reset using Shutter1 may be allowed to collect charge for a first integration time IT1 (see, FIG. 7).

At time t6 (i.e., a Shutter2 activation time), signal RST, TXVc, and TXH1 may be simultaneously pulsed high to reset pixels that are arranged along row L and that receive TXVc. This example in which only row L can be reset using Shutter2 is merely illustrative. Any number of rows and tile columns may be reset using Shutter2. All pixels that are being reset using Shutter2 may be allowed to collect charge for a first integration time IT2 that is different than IT1.

At time t7 (i.e., a Shutter3 activation time), signal RST, TXVb, TXVd, and TXHm may be simultaneously pulsed high to reset pixels that are arranged along row m and that receive TXVb and TXVd. This example in which only row m is being reset using Shutter3 is merely illustrative. Any number of rows and tile columns may be reset using Shutter3. All pixels that are being reset using Shutter3 may be allowed to collect charge for a first integration time IT3 that is different than IT1 and IT2. At time t8, a subsequent row (i.e., row 2) may be read out.

The operations shown in FIG. 8 are merely illustrative and are not intended to limit the scope of the present invention. If desired, the order of steps may be changed, and more or less steps may be employed. In yet other suitable embodiments, less than three additional shutters may be implemented or more than three additional shutters may be implemented. An image sensor that is capable of converting signals into floating point numbers that that allow different tiles to have different integration times using multiple shutters can help speed up ADC conversion time and help reduce power consumption while allowing use of lower resolution ADCs, which can also help reduce die area and cost.

Figure 9:
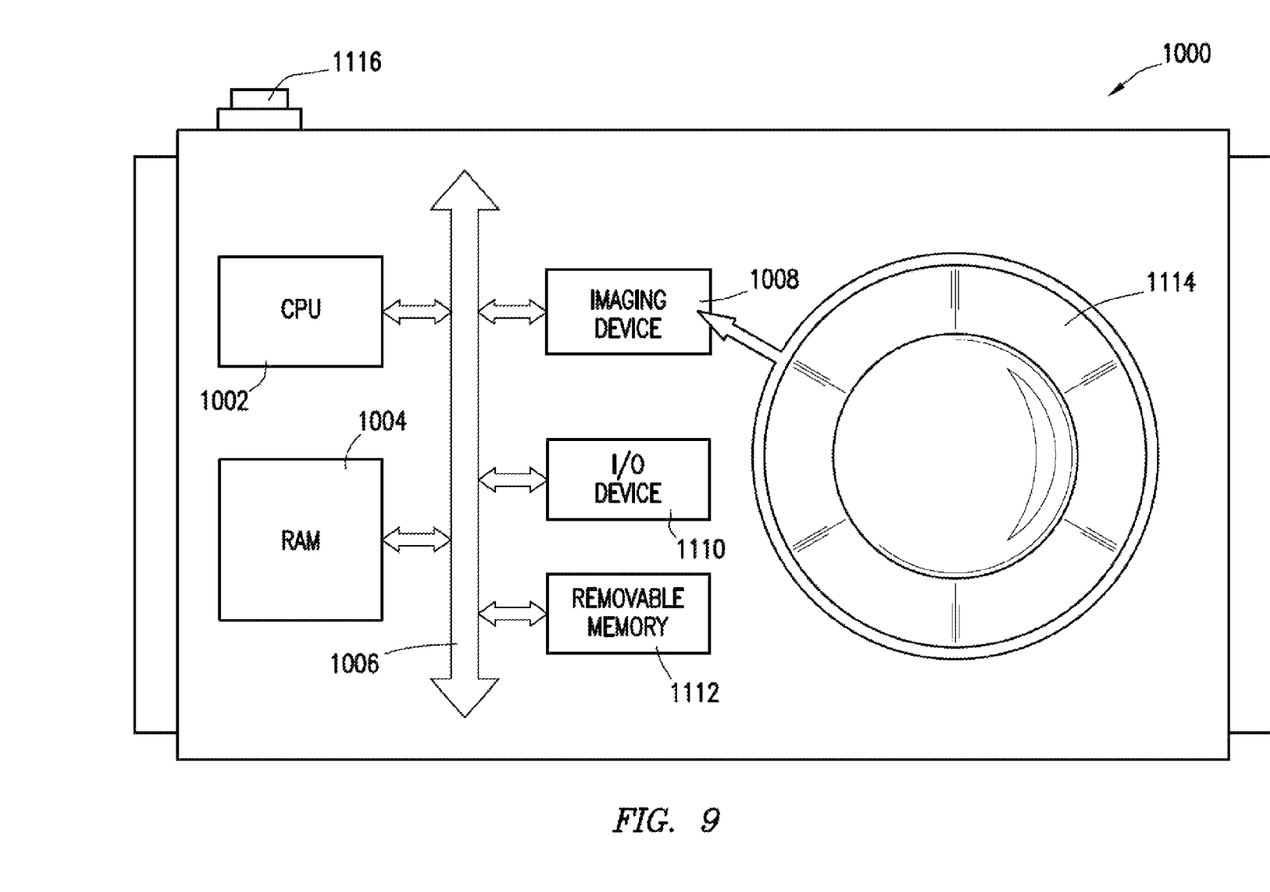
FIG. 9 is a block diagram of a system employing the embodiments of FIGS. 3-8 in accordance with an embodiment of the present invention.

FIG. 9 is a simplified diagram of an illustrative processor system 1000, such as a digital camera, which includes an imaging device 1008 (e.g., the camera module of FIG. 1) employing an imager having pixels with improved pixel readout and multiple shutter capabilities as described above. Without being limiting, such a system could include a computer system, still or video camera system, scanner, machine vision system, vehicle navigation system, video phone, surveillance system, auto focus system, star tracker system, motion detection system, image stabilization system, and other systems employing an imaging device.

Processor system 1000, for example a digital still or video camera system, generally includes a lens 1114 for focusing an image onto one or more pixel array in imaging device 1008 when a shutter release button 1116 is pressed and a central processing unit (CPU) 1002 such as a microprocessor which controls camera and one or more image flow functions. Processing unit 1102 can communicate with one or more input-output (I/O) devices 1110 over a system bus 1006. Imaging device 1008 may also communicate with CPU 1002 over bus 1006. System 1000 may also include random access memory (RAM) 1004 and can optionally include removable memory 1112, such as flash memory, which can also communicate with CPU 1002 over the bus 1006. Imaging device 1008 may be combined with the CPU, with or without memory storage on a single integrated circuit or on a different chip. Although bus 1006 is illustrated as a single bus, it may be one or more busses, bridges or other communication paths used to interconnect system components of system 1000.

Various embodiments have been described illustrating imagers with pixels having improved pixel readout and analog-to-digital conversion capabilities.

An imager may include an array of image sensor pixels arranged in rows and columns. The array of image pixels may be organized into tiles each of which includes multiple rows and columns of image sensor pixels. The imager may also include a plurality of shutter tile column memory circuits. Tiles that receive bits from a first shutter tile column memory circuit in the plurality of shutter tile column memory circuits are allowed to collect charge for a first period of time, whereas tiles that receive bits from a second shutter tile column memory circuit in the plurality of shutter tile column memory circuits are allowed to collect charge for a second period of time that is different than the first period of time.

The imager may also include at least one multiplexer having inputs for receiving bits from respective shutter tile column memory circuits and an output. The imager may also include at least one logic gate (e.g., a logic OR gate) having a first input that is coupled to the output of the multiplexer, a second input that receives a row-wise read enable signal, and an output.

In at least some embodiments, each image sensor pixel in the array may have a multi-gate charge transfer transistor. Each multi-gate charge transfer transistor in a given column of tiles has a first gate that is coupled to the output of an associated logic gate via a column control path and a second gate that receives different row control signals via respective row control paths.

The imager may also include readout circuitry (e.g., ADC circuitry) that generates mantissa information during readout operations. The mantissa information may be combined with exponent information obtained during auto exposure operations to yield floating point numbers. Each tile may be associated with an exponent value and may therefore be assigned different integration times by loading the plurality of shutter tile column memory circuits with appropriate bits.

The foregoing is merely illustrative of the principles of this invention and various modifications can be made by those skilled in the art. The foregoing embodiments may be implemented individually or in any combination.

Although the invention has been described in some detail for the purposes of clarity, it will be apparent that certain changes and modifications can be practiced within the scope of the appended claims. Although some of the appended claims are single dependent only or reference only some of their preceding claims, their respective feature(s) can be combined with the feature(s) of any other claim.

What is claimed is:

1. An image sensor, comprising:
   an array of image sensor pixels arranged in rows and columns, wherein the array is grouped into a plurality of tiles each of which includes multiple rows and columns of image sensor pixels;
   a plurality of shutter tile column memory circuits, wherein each tile in the plurality of tiles receives bits from a selected one of the plurality of shutter tile column memory circuits; and
   readout circuitry, wherein the readout circuitry is configured to read data out from a selected row of image sensor pixels that is part of a first tile in the plurality of tiles at a first point in time, and wherein the image sensor performs a reset on one other row of image sensor pixels that is part of a second tile in the plurality of tiles at a second point in time that is different than the first point in time.

2. The image sensor defined in claim 1, wherein a first portion of tiles in the plurality of tiles exhibits a first integration time when receiving bits from a first shutter tile column memory circuit in the plurality of shutter tile column memory circuits, and wherein a second portion of tiles in the plurality of tiles exhibits a second integration time that is different than the first integration time when receiving bits from a second shutter tile column memory circuit in the plurality of shutter tile column memory circuits.

3. The image sensor defined in claim 1, wherein each image sensor pixel in the array comprises:
   a photodiode;
   a floating diffusion region; and
   a double gate charge transfer transistor coupled between the photodiode and the floating diffusion region.

4. The image sensor defined in claim 3, wherein the double gate charge transfer transistor comprises a first gate that receives the bits from the plurality of shutter tile column memory circuits via a column control line and a second gate that receives a row control signal via a row control line.

5. The image sensor defined in claim 1, wherein the array of image sensor pixels is read out using a rolling shutter scheme, wherein a first shutter tile column memory circuit in the plurality of shutter tile column memory circuits serves to perform a first additional shutter reset for the array at a third point in time, wherein the third point in time is different than the first and second points in time, and wherein a second shutter tile column memory circuit in the plurality of shutter tile column memory circuits serves to perform a second additional shutter reset for the array at a fourth point in time that is different than the first, second, and third points in time.

6. The image sensor pixel defined in claim 1, wherein the readout circuitry is configured to convert pixel signals received from the array of image sensor pixels into floating point numbers.

7. The image sensor pixel defined in claim 1, wherein the bits that are stored in the plurality of shutter tile column memory circuits are obtained during an auto exposure period.

8. The image sensor pixel defined in claim 1, further comprising:
   a multiplexer that is coupled between the plurality shutter tile column memory circuits and the array of image sensor pixels.

9. The image sensor pixel defined in claim 8, further comprising:
   a logic gate that is coupled between the multiplexer and the array of image sensor pixels.

10. The image sensor pixel defined in claim 9, wherein the logic gate has a first input that is coupled to an output of the multiplexer and a second input that receives a read enable signal.

11. A method of operating an image sensor that includes an array of image sensor pixels arranged in rows and columns, wherein the array is grouped into tiles each of which includes multiple rows and columns of image sensor pixels, the method comprising:
   with a plurality of shutter tile column memory circuits, providing bits to the array of image sensor pixels, wherein each tile in the array of image sensor pixels receives bits from a selected one of the plurality of shutter tile memory circuits;
   with readout circuitry, reading data out from a selected row of image sensor pixels that is part of a first tile in the array; and
   after reading data out from the row of image sensor pixels and before reading data out from another row, performing shutter reset on one other row of image sensor pixels that is part of a second tile in the array that is different than the first tile.

12. The method defined in claim 11, further comprising:
   after performing the shutter reset on the one other row of image sensor pixels and before reading data out from another row, performing an additional shutter reset on yet another row of image sensor pixels that is different from the selected row and the one other row.

13. The method defined in claim 11 wherein providing bits to the array of image sensor pixels determines whether each tile is allowed to integrate for a first period of time or to integrate for a second period of time that is different than the first period of time.

14. The method defined in claim 13, further comprising:
   performing auto exposure operations to obtain the bits that are stored in the plurality of shutter tile column memory circuits.

15. The method defined in claim 11, wherein each image sensor pixel in the array has a double gate charge transfer transistor, the method further comprising:
   providing a row control signal to a first gate terminal of the double gate charge transfer transistor;
   providing a column control signal to a second gate terminal of the double gate charge transfer transistor; and
   asserting a read enable signal to force the column control signal high.

16. A system, comprising:
   a central processing unit;
   memory;
   input-output circuitry; and
   an imaging device, wherein the imaging device comprises:
   an array of image sensor pixels arranged in rows and columns, wherein the array is grouped into tiles each of which includes multiple rows and columns of image sensor pixels;
   a first shutter tile column memory circuit that provides asserted bits to a first portion of tiles such that the first portion of tiles exhibits a first integration time;

a second shutter tile column memory circuit that provides asserted bits to a second portion of tiles that is different than the first portion such that the second portion of tiles exhibits a second integration time that is different than the first integration time; and readout circuitry, wherein the readout circuitry is configured to read data out from a selected row of image sensor pixels that is part of a first tile in the array at a first time, and wherein the image sensor performs a first shutter reset on one other row of image sensor pixels that is part of a second tile in the array at a second time that is different than the first time.

17. The system defined in claim 16, wherein the imaging device further comprises:

a multiplexer having a first input that is coupled to the first shutter tile column memory circuit, a second input that is coupled to the second shutter tile column memory circuit, and an output.

18. The system defined in claim 17, wherein the imaging device further comprises:

a logic OR gate having a first input that is coupled to the output of the multiplexer, a second input that receives a read enable signal, and an output.

19. The system defined in claim 18, wherein each image sensor pixel in the array has a multi-gate charge transfer transistor, and wherein each multi-gate charge transfer transistor in a given column of tiles has a first gate that is coupled to the output of the logic OR gate and a second gate that receives respective different row control signals.

20. The system defined in claim 16 wherein the readout circuitry generates mantissa information during readout operations, wherein the mantissa information is combined with exponent information obtained during auto exposure operations to yield floating point numbers.

* * * * *